United States Patent
Hewitt et al.

(10) Patent No.: US 11,665,125 B2
(45) Date of Patent: May 30, 2023

(54) MESSAGE RENOTIFICATION

(71) Applicant: International Business Machines Corporation, Armonk, NY (US)

(72) Inventors: Trudy L. Hewitt, Cary, NC (US); Zachary A. Silverstein, Jacksonville, FL (US); Fang Lu, Billerica, MA (US); Melissa Restrepo Conde, Leland, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/002,808

(22) Filed: Aug. 26, 2020

(65) Prior Publication Data

US 2022/0070132 A1 Mar. 3, 2022

(51) Int. Cl.
*H04L 51/234* (2022.01)
*G06F 40/253* (2020.01)
*H04L 51/043* (2022.01)
*H04L 51/42* (2022.01)

(52) U.S. Cl.
CPC .......... *H04L 51/234* (2022.05); *G06F 40/253* (2020.01); *H04L 51/043* (2013.01); *H04L 51/42* (2022.05)

(58) Field of Classification Search
None
See application file for complete search history.

(56) References Cited

U.S. PATENT DOCUMENTS

| | | | |
|---|---|---|---|
| 8,838,633 B2 | 9/2014 | Dhillon | |
| 9,037,114 B2 | 5/2015 | Khoury | |
| 10,447,639 B2 | 10/2019 | Ali | |
| 2006/0168346 A1* | 7/2006 | Chen | H04L 51/18 709/246 |
| 2009/0248801 A1* | 10/2009 | Then | G06Q 10/10 709/204 |
| 2010/0198931 A1 | 8/2010 | Pocklington | |
| 2016/0028677 A1 | 1/2016 | Narasimhan | |
| 2016/0269184 A1* | 9/2016 | VanBlon | H04L 9/3247 |
| 2017/0041281 A1 | 2/2017 | Farrell | |
| 2017/0346938 A1 | 11/2017 | Allen | |
| 2017/0364939 A1* | 12/2017 | Abou Mahmoud | G06Q 30/0231 |
| 2018/0039608 A1* | 2/2018 | Sharifi | G06F 40/232 |
| 2019/0320060 A1* | 10/2019 | Seidman | H04L 51/14 |

* cited by examiner

*Primary Examiner* — Kevin S Mai
(74) *Attorney, Agent, or Firm* — Stephanie L. Carusillo

(57) ABSTRACT

In response to determining that an original message from a sender has been viewed by one or recipients of the original message, a determination is made whether the original message has been edited by the sender. In response to determining that the original message has been edited, another determination is made whether the edits are critical based, at least in part, on a change of context of the original message. In response to determining that the edits are critical, re-notifying the one or more recipients that the original message has been edited by the sender.

14 Claims, 3 Drawing Sheets

MESSAGE RENOTIFICATION

BACKGROUND

The present invention relates generally to the field of messaging systems, and more particularly to providing for a renotification of a recipient following a message edit by a sender.

There are many different messaging systems available to people today. Text messaging, both short message service (i.e., a text only message) and multimedia messaging service (i.e., a text message that includes a photograph or a video) is quick, convenient, and available to anyone with a cellular device such as a smartphone. Corporations use instant messaging systems so that employees can communicate easily with one another for business needs (e.g., "Jake, you're late for the department meeting!") and sometimes for non-business needs (e.g., "Hi Emily, would you like to go out to lunch?"). A useful feature of some messaging systems is allowing a message sender to edit a sent message.

SUMMARY OF THE INVENTION

Embodiments of the present invention include an approach for providing for a renotification of a recipient following a message edit by a sender. In one embodiment, in response to determining that an original message from a sender has been viewed by one or recipients of the original message, a determination is made whether the original message has been edited by the sender. In response to determining that the original message has been edited, another determination is made whether the edits are critical based, at least in part, on a change of context of the original message. In response to determining that the edits are critical, re-notifying the one or more recipients that the original message has been edited by the sender.

DETAILED DESCRIPTION

Embodiments of the present invention recognize that the use of messaging systems is widespread in public, private, and business environments. In some instances, sending a message that includes an error (e.g., "Do you want to go to a movie on Saturday?"; should be "movie") is inconsequential. However, in other instances, a message with an error could have severe consequences (e.g., "Ann—Please send the personnel file to Bill."; should be Jill in Human Resources as Bill is the wrong recipient of the message). Fortunately, the sender of the message to Ann is able to edit the message correcting the error (e.g., "Ann—Please send the personnel file to Jill.") so the potential problem is averted. Or is it? What if Ann has seen only the first message (because the messaging system notified her of the incoming message via an audible beep) and has not seen the edited version of the message because there was not a notification for the edited message? Ann would see the edited message if the messaging system included a renotification for a message that has been (i) seen by the recipient and (ii) subsequently edited by the sender.

Embodiments of the present invention recognize that there may be a method, computer program product, and computer system for providing for a renotification of a recipient following a message edit by a sender. In an embodiment, the method, computer program product, and computer system analyzes a sent message and determines if the sent message has been viewed by the recipient. If the message has been viewed, and the sender then edits the message, the present invention can reanalyze the message to determine the criticality of the edit. If the edit is critical, the present invention will notify the recipient that the message has been edited.

References in the specification to "one embodiment", "an embodiment", "an example embodiment", etc., indicate that the embodiment described may include a particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention will now be described in detail with reference to the Figures.

Figure 1:
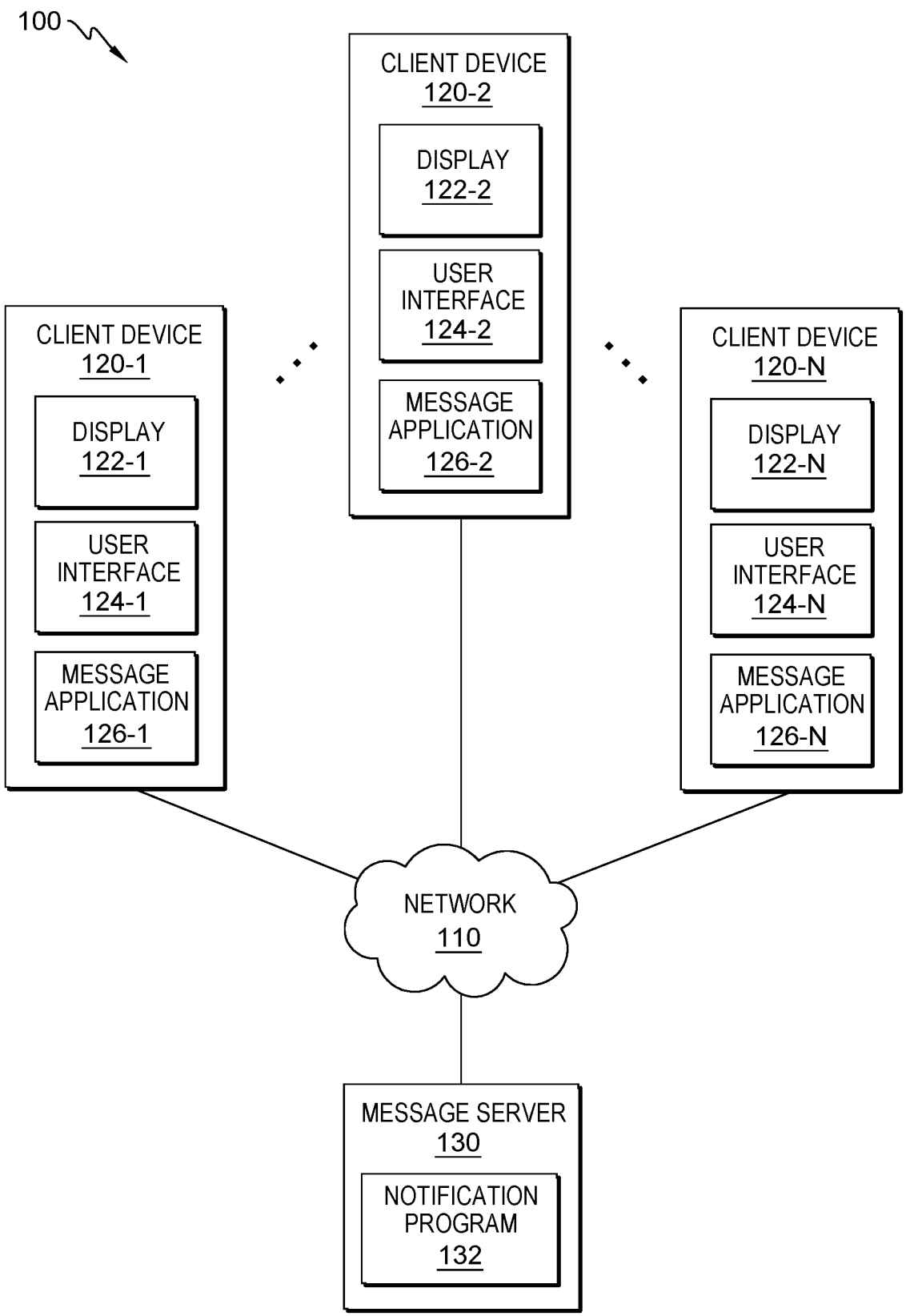
FIG. 1 depicts a functional block diagram of a computing environment, in accordance with an embodiment of the present invention.

FIG. 1 is a functional block diagram illustrating a computing environment, generally designated 100, in accordance with one embodiment of the present invention. FIG. 1 provides only an illustration of one implementation and does not imply any limitations with regard to the systems and environments in which different embodiments may be implemented. Many modifications to the depicted embodiment may be made by those skilled in the art without departing from the scope of the invention as recited by the claims.

In an embodiment, computing environment 100 includes client device 120-1, client device 120-2, client device 120-N(used to represent any number of client device 120), and message server 130, interconnected by network 110. In example embodiments, computing environment 100 includes other computing devices (not shown in FIG. 1) such as smartwatches, cell phones, additional smartphones, wearable technology, phablets, tablet computers, additional laptop computers, additional desktop computers, other computer servers or any other computer system known in the art, interconnected with client device 120-1, client device 120-2, client device 120-N, and message server 130 over network 110

In embodiments of the present invention, client device 120-1, client device 120-2, client device 120-N, and message server 130 are connected to network 110, which enables client device 120-1, client device 120-2, client device 120-N, and message server 130 to access other computing devices and/or data not directly stored on client device 120-1, client device 120-2, client device 120-N, and message server 130. Network 110 may be, for example, a short-range, low power wireless connection, a local area network (LAN), a telecommunications network, a wide area network (WAN) such as the Internet, or any combination of the four, and include wired, wireless, or fiber optic connections. In an embodiment, network 110 includes one or more wired and/or wireless networks that are capable of receiving and transmitting data, voice, and/or video signals, including multimedia signals that include voice, data, and video information. In general, network 110 is any combination of connections and protocols that will support communications between client device 120-1, client device 120-2, client device 120-N, and message server 130, and any other computing devices (not shown in FIG. 1) connected to network 110, in accordance with embodiments of the present invention. In an embodiment, data received by another computing device (not shown in FIG. 1) in computing environment 100 is communicated to client device 120-1, client device 120-2, client device 120-N, and message server 130 via network 110.

In an embodiment, client device 120-1, client device 120-2, and client device 120-N are one of a laptop, tablet, or netbook personal computer (PC), a desktop computer, a personal digital assistant (PDA), a smartphone, a standard cell phone, a smartwatch or any other wearable technology, or any other hand-held, programmable electronic device capable of communicating with any other computing device within computing environment 100. For ease of reading, client device 120-N will be used throughout this document and is applicable to any instance of client device 120-1, client device 120-2, and any other instances of client device 120 (not shown in FIG. 1). According to embodiments, client device 120-N can be a standalone computing device, a management server, a web server, a mobile computing device, or any other electronic device or computing system capable of receiving, transmitting, and processing data. In other embodiments, client device 120-N can represent computing systems utilizing multiple computers as a server system, such as in a cloud computing environment. In certain embodiments, client device 120-N represents a computer system utilizing clustered computers and components (e.g., database server computers, application server computers, etc.) that act as a single pool of seamless resources when accessed by elements of computing environment 100. In general, client device 120-N is representative of any electronic device or combination of electronic devices capable of executing computer readable program instructions. In an embodiment, computing environment 100 includes any number of client device 120-N. Client device 120-N may include internal and external hardware components as depicted and described in further detail with respect to FIG. 3, in accordance with embodiments of the present invention. In an embodiment, client device 120-N includes display 122-N(which refers to any instance of display 122 such as display 122-1 and display 122-2), user interface 124-N (which refers to any instance of user interface 124 such as user interface 124-1 and user interface 124-2), and message application 126-N(which refers to any instance of message application 126 such as message application 126-1 and message application 126-2).

According to embodiments of the present invention, display 122-N is an electronic visual device for a desktop computer, laptop computer, tablet computer, smartphone, smart-watch, and the like. Display 122-N may include a touchscreen which is an input device layered on top of the display for allowing a user to control an electronic device via simple or multi-touch gestures by touching display 122-N with a special stylus and/or one or more fingers. Display 122-N displays open programs and applications, allowing a user of client device 120-N to interact with the open programs and applications via a keyboard, mouse, and buttons (not shown in FIG. 1). Display 122-N may be a thin film transistor liquid crystal display (TFT-LCD), a flat panel LED (light emitting diode) display, a cathode ray tube (CRT), or any type of display device known in the art or developed in the future. Display 122-N may be connected to client device 120-N via VGA (video graphics array), DVI (digital video interface), HDMI (High Definition Multi-Media Interface) or any other connection type known in the art.

In an embodiment, user interface 124-N provides an interface between a user of client device 120-N and message application 126-N. User interface 124-N may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 124-N may also be mobile application software that provides an interface between client device 120-N and message application 126-N. Mobile application software, or an "app," is a computer program designed to run on smartphones, tablet computers and other mobile devices. User interface 124-N enables a user of client device 120-N to interact with message application 126-N, message server 130, and any other computing devices not shown in FIG. 1.

According to one embodiment, message application 126-N is a software program or group of programs designed for end users for messaging between said end users. Examples of other end user programs include a word processor, a spreadsheet, an accounting application, a web browser, an email client, a media player, a file viewer, an aeronautical flight simulator, a console game, and a photo editor. Message application message application 126-N may be bundled with the client device 120-N and its system software or published separately, and may be coded as proprietary, open-source, or a university project. Software application, such as message application message application 126-N that are built for mobile platforms are called mobile apps. In an embodiment, message application 126-N allows for a user to send messages to other users, to receive messages from other users, and to edit messages that have been sent by a user and viewed by one or more recipients.

In an embodiment, message server 130 may be one of a laptop, tablet, or netbook personal computer (PC), a desktop computer, a personal digital assistant (PDA), a smartphone, a standard cell phone, a smartwatch or any other wearable technology, or any other hand-held, programmable electronic device capable of communicating with any other computing device within computing environment 100. According to embodiments, message server 130 can be a standalone computing device, a management server, a web server, a mobile computing device, or any other electronic device or computing system capable of receiving, transmitting, and processing data. In other embodiments, message server 130 can represent computing systems utilizing multiple computers as a server system, such as in a cloud computing environment. In certain embodiments, message server 130 represents a computer system utilizing clustered computers and components (e.g., database server computers, application server computers, etc.) that act as a single pool of seamless resources when accessed by elements of computing environment 100. In general, message server 130 is representative of any electronic device or combination of electronic devices capable of executing computer readable program instructions. In an embodiment, computing environment 100 includes any number of message server 130. Message server 130 may include internal and external hardware components as depicted and described in further detail with respect to FIG. 3, in accordance with embodiments of the present invention. According to an embodiment, message server 130 allows for messaging between multiple instances of client device 120-N and supports message application 126-N. In an embodiment, message server 130 includes notification program 132.

According to an embodiment of the present invention, notification program 132 can be a program, a subprogram of a larger program, an application, a plurality of applications, or mobile application software, which functions to provide for a renotification of a recipient following a message edit by a sender. A program is a sequence of instructions written to perform a specific task. In an embodiment, notification program 132 runs by itself. In other embodiments, notification program 132 depends on system software (not shown in FIG. 1) to execute. In one embodiment, notification program 132 functions as a stand-alone program residing on message server 130. In another embodiment, notification program 132 works in conjunction with other programs, applications, etc., found in computing environment 100. In yet another embodiment, notification program 132 resides on any computing device within computing environment 100, for example, client device 120-N. In yet another embodiment, notification program 132 resides on other computing devices (not shown in FIG. 1) in computing environment 100, which are interconnected to message server 130 via network 110.

According to an embodiment, notification program 132 receives an indication of a sent message. In the embodiment, notification program 132 analyzes the sent message. Further in the embodiment, notification program 132 determines if the message has been viewed and if so, further determines if the viewed message has been edited. Further yet in the embodiment, in response to determining that the viewed message has been edited, notification program 132 analyzes the edited message and determines whether the edits are critical. Further yet in the embodiment, responsive to determining that the edits are critical, notification program 132 renotifies the recipients who viewed the original message so that said recipients can view the edited message.

Figure 2:
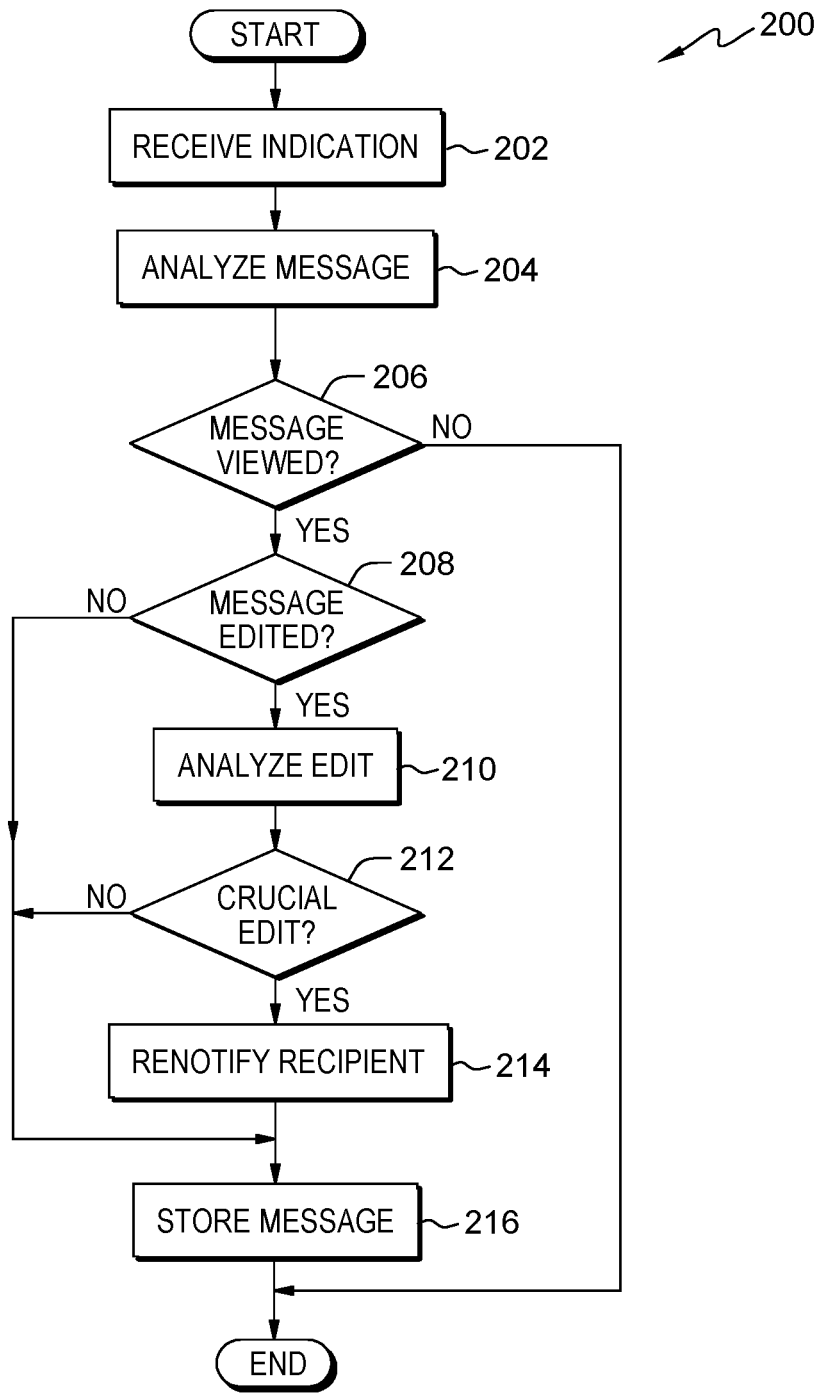
FIG. 2 depicts a flowchart of a program providing for a renotification of a recipient following a message edit by a sender, in accordance with an embodiment of the present invention.

FIG. 2 is a flowchart of workflow 200 depicting a method for providing for a renotification of a recipient following a message edit by a sender. In one embodiment, the method of workflow 200 is performed by notification program 132. In an alternative embodiment, the method of workflow 200 is performed by any other program working with notification program 132. In an embodiment, a user of client device 120-N invokes workflow 200 upon sending a message. In an alternative embodiment, a user of client device 120-N invokes workflow 200 upon editing a message.

In an embodiment, notification program 132 receives indication (step 202). In other words, notification program 132 receives an indication that a message has been sent by a first user. According to an embodiment, the sent message is a text message. According to another embodiment, the sent message is an instant message. According to yet another embodiment, the sent message is any type of message that can be edited after said message was sent. In an embodiment, the user of client device 120-1 sends a message over network 110 to a user of client device 120-2 and notification program 132 receives an indication of the sent message. For example, a program on a company server receives an indication that Jack sent Jill the following message using the available instant messaging system—"Hey Jill, send the salary plan and promotion list to Louis ASAP! Thanks."

According to an embodiment of the present invention, notification program 132 analyzes message (step 204). In other words, notification program 132 analyzes the sent message using available techniques known in the art for analyzing content. In an embodiment, available techniques include, but are not limited to, Natural Language Processing (NLP), Natural Language Classifier (NLC), Machine Learning (ML), and any other similar techniques known in the art. These techniques are used to identify subjects and verbs (i.e., important content) in the message as well as adjectives and adverbs (i.e., less important content) in the message as part of the analysis of the message. According to an embodiment, notification program 132 uses NLP, NLC, and ML to analyze the sent message. For example, the program on the company server analyzes the message sent by Jack to Jill. The analysis determines the following information: (i) overall, the message is an action item for the recipient; (ii) the action item is "send the salary plan and promotion list"; (iii) the subject performing the action is "Jill"; and (iv) the subject receiving that action is "Louis".

NLP is a subfield of linguistics, computer science, information engineering, and artificial intelligence concerned with the interactions between computers and human (natural) languages, in particular how to program computers to process and analyze large amounts of natural language data. Challenges in natural language processing frequently involve speech recognition, natural language understanding, and natural language generation. Categories of tasks performed by NLP include "syntax" (e.g., part-of-speech tagging and parsing), "semantics" (e.g., relationship extraction, sentiment analysis, and topic segmentation), "discourse" (e.g., automatic summarization and discourse analysis), and "speech" (e.g., speech recognition and speech segmentation).

NLC classifies text into custom categories using cognitive computing techniques. Text classification, as performed by NLC, is foundational for NLP and ML. Some uses for NLC include identifying and flagging inappropriate comments on social media, understanding sentiment within customer reviews, and determining whether an e-mail should be sent to an inbox or filtered into a spam folder.

ML is the scientific study of algorithms and statistical models that computer systems use to perform a specific task without using explicit instructions, relying on patterns and inference instead. ML is seen as a subset of artificial intelligence (AI). ML algorithms build a mathematical model based on sample data, known as "training data", in order to make predictions or decisions without being explicitly programmed to perform the task. ML algorithms are used in a wide variety of applications, such as e-mail filtering and computer vision, where it is difficult or infeasible to develop a conventional algorithm for effectively performing the task. ML is closely related to computational statistics, which focuses on making predictions using computers. The study of mathematical optimization delivers methods, theory and application domains to the field of ML. Data mining is a field of study within ML and focuses on exploratory data analysis through unsupervised learning. In its application across business problems, ML is also referred to as predictive analytics.

In an embodiment, notification program 132 determines whether message is viewed (decision step 206). In other words, notification program 132 determines whether the sent message has been viewed by one or more recipients of the sent message. According to an embodiment, methods for making the determination include, but are not limited to, eye gaze of the one or more recipients, visual recognition, mouse tracking, interaction tracking, and any other methods known in the art for monitoring a user. In an embodiment (decision step 206, NO branch, notification program 132 determines that the message has not been viewed by the one or more recipients; therefore, notification program 132 ends and the message notification process is carried out. In the embodiment (decision step 206, YES branch), notification program 132 determines that the message has been viewed by the one or more recipients; therefore, notification program 132 proceeds to decision step 208 to determine if the viewed message has been edited.

In an embodiment, notification program 132 determines whether message is edited (decision step 208). In other words, responsive to determining that a message has been viewed by the one or more recipients, notification program 132 determines whether said message has been edited by the sender. According to an embodiment, notification program 132 determines whether the viewed message is edited by the sender by monitoring said sender to determine if edits are made or by reviewing the message actions and notations within the messaging system (e.g., the notation "(edited)" is added to a message by the messaging system when the message has been edited by the sender. In an embodiment (decision step 208, NO branch), notification program 132 determines that the viewed message has not been edited; therefore, notification program 132 proceeds to step 216 to store the viewed message. In the embodiment (decision step 208, YES branch), notification program 132 determines that the viewed message has been edited; therefore, notification program 132 proceeds to step 210 to analyze the changes made to the viewed message.

According to an embodiment of the present invention, notification program 132 analyzes edit (step 210). In other words, responsive to determining that the viewed message has been edited, notification program 132 analyses the edited message. In an embodiment, notification program 132 utilizes NLP, NLC, ML (previously discussed), and any other similar techniques known in the art to analyze the edited message. According to an embodiment, notification program 132 utilizes NLP, NLC and ML to analyze the edited message that has been viewed by the one or more recipients. For example, the original message of "Hey Jill, send the salary plan and promotion list to Louis ASAP! Thanks." that was sent by Jack has been edited by Jack and now states "Hey Jill, send the salary plan and promotion list to Louise ASAP! Thanks." Thus, the program on the company server analyzes the edited message and determines that the subject receiving the action of the message has changed from "Louis" to "Louise".

According to an embodiment of the present invention, notification program 132 determines whether the message edit is critical (decision step 212). In other words, notification program 132 utilizes the results of the analysis of the edited message to determine whether the edits made are critical to the meaning (i.e., context) of the message. In an embodiment, a change to one or more of the subject, verb, action, critical object, or context of the message is assigned an edit score of "1.0". Further in the embodiment, correcting a spelling error or changing grammar is assigned an edit score of "0.2". Further yet in the embodiment, if the sum of all of the individual edit scores equals or exceeds an overall edit score threshold of "1.0", the edit is considered critical. Thus, a single edit of the subject, verb, action, or critical object (i.e., a single, major change) of the message means the edit is critical while four or fewer minor changes to spelling or grammar means that those edits, alone or in combination, are not critical. In the embodiment, the subject is the user (or users) who received the message, the verb and action is what is happening as a result of the message, and the critical object(s) is the item(s) being acted upon. Thus, in the example message "Hey Jill, send the salary plan and promotion list to Louis ASAP! Thanks." The subject is "Jill", the verb and action is "send . . . to Louis" and the critical objects are the "salary plan and promotion list". In one embodiment (decision step 212, NO branch), notification program 132 determines that the edits made to the viewed message are not critical; therefore, notification program 132 proceeds to step 216 to store the viewed and edited message. In the embodiment (decision step 212, YES branch), notification program 132 determines that the edits made to the viewed message are critical; therefore, notification program 132 proceeds to step 214 to renotify the one or more recipients who have viewed the message.

According to an embodiment, a critical edit is when the subject, verb, action, critical object, or context is changed; however, a spelling error is corrected or grammar is changed, the edit is not critical. As an example of a change of subject, verb, action, or critical object only, consider the edited message "Brian, please send print the updated file to for Nick". Here, an action has changed from "send" to "print". This edit has an edit score of "1.0" which exceeds the threshold; therefore, the edit is critical. As an example of a change of context, consider the original and edited messages "Maeve, please put a chart together on what we discussed" and "Maeve, sorry, I actually do not need that chart". Here, the context of the message has changed from performing an action to no longer needing said action. This message edit has an edit score of "1.0" which exceeds the threshold; therefore, the edit is critical. As an example of a change of subject, verb, action, or critical object and a change in context, consider the original and edited messages "Deb, please e-mail the presentation to Cheryl" and "Deb, I intended to say print the presentation for Cheryl, but Cheryl already has a copy so another one is not needed, sorry". Here, an action changed from "e-mail" to "print" and the context has changes from performing an action to not performing said action. This message edit has an edit score of "2.0" which exceeds the threshold; therefore, the edit is critical.

In an embodiment, notification program 132 renotifies recipient (step 214). In other words, responsive to determining that the message edit of the viewed message is critical, notification program 132 renotifies the one or more recipients (who have viewed the original message) of the edited message. According to an embodiment, notification program 132 utilizes the same type of notification as was used for the original message (e.g., a pop-up message indicating a new message received by the messaging system). According to another embodiment, notification program 132 utilizes a different type of notification as was used for the original message (e.g., an audible sound instead of a pop-up message). According to yet another embodiment, notification program 132 uses multiple types of notifications to indicate the edited message (e.g., an audible sound and a blinking message icon). In an embodiment, only the edited message is shown to the one or more recipients. In another embodiment, the edited message and the changes are shown to the one or more recipients. According to an embodiment of the present invention, notification program 132 renotifies the user of client device 120-2 (as this user was the only recipient of the message sent by the user of client device 120-1) via network 110 of the message edit made by the user of client device 120-1. For example, the program on the company server renotifies Jill of the edits made by Jack to the message Jill has already viewed via a blinking icon on the computing device used by Jill. In addition to the blinking icon, the program displays the edited message as follows: "[EDIT] Hey Jill, send the salary plan and promotion list to Louise (Louis) ASAP! Thanks."

According to an embodiment of the present invention, notification program 132 stores message (step 216). In other words, notification program 132 stores the messages in the messaging system. In an embodiment, notification program 132 stores viewed messages that have not been edited. In another embodiment, notification program 132 stores viewed messages that have been edited by the message sender. In the embodiment, notification program 132 maps the original message to the edited message when storing the edited message so that the edit history is maintained. According to an embodiment, notification program 132 on message server 130 stores the message sent by the user of client device 120-1 and the edited message sent by the user of device 120-1 to an available memory or database (not shown in FIG. 1). For example, the company server stores the following messages: (i) "Hey Jill, send the salary plan and promotion list to Louis ASAP! Thanks." and (ii) "[EDIT] Hey Jill, send the salary plan and promotion list to Louise ASAP! Thanks."

In an embodiment, notification program 132 may determine that one or more of the message recipients may have responded to the message prior to any edits of the message by the sender. In the embodiment, notification program 132 creates a virtual grouping of the message, the one or more responses to the message, any edit of the message (if such an edit exists), and any reply or replies by the sender of the message based on the one or more responses. Further in the embodiment, notification program 132 displays the virtual grouping (e.g., in a graphical user interface (GUI)) to show the history of the grouping; via the GUI, a user can toggle within the grouping to see the history of the message to determine which message pairs with which response and the user can select a portion of content in the virtual grouping to cause notification program 132 to display the selected portion of content to the user. Further yet in the embodiment, notification program 132 may dynamically remove content from the virtual pairings if the content is no longer relevant (e.g., based on a recipient response and a reply from the sender, an original message is no longer relevant to the virtual pairing). Further yet in the embodiment, notification program 132 may prompt the message sender or one or more of the message recipients to remove content from the virtual pairings when that content is incorrect.

Figure 3:
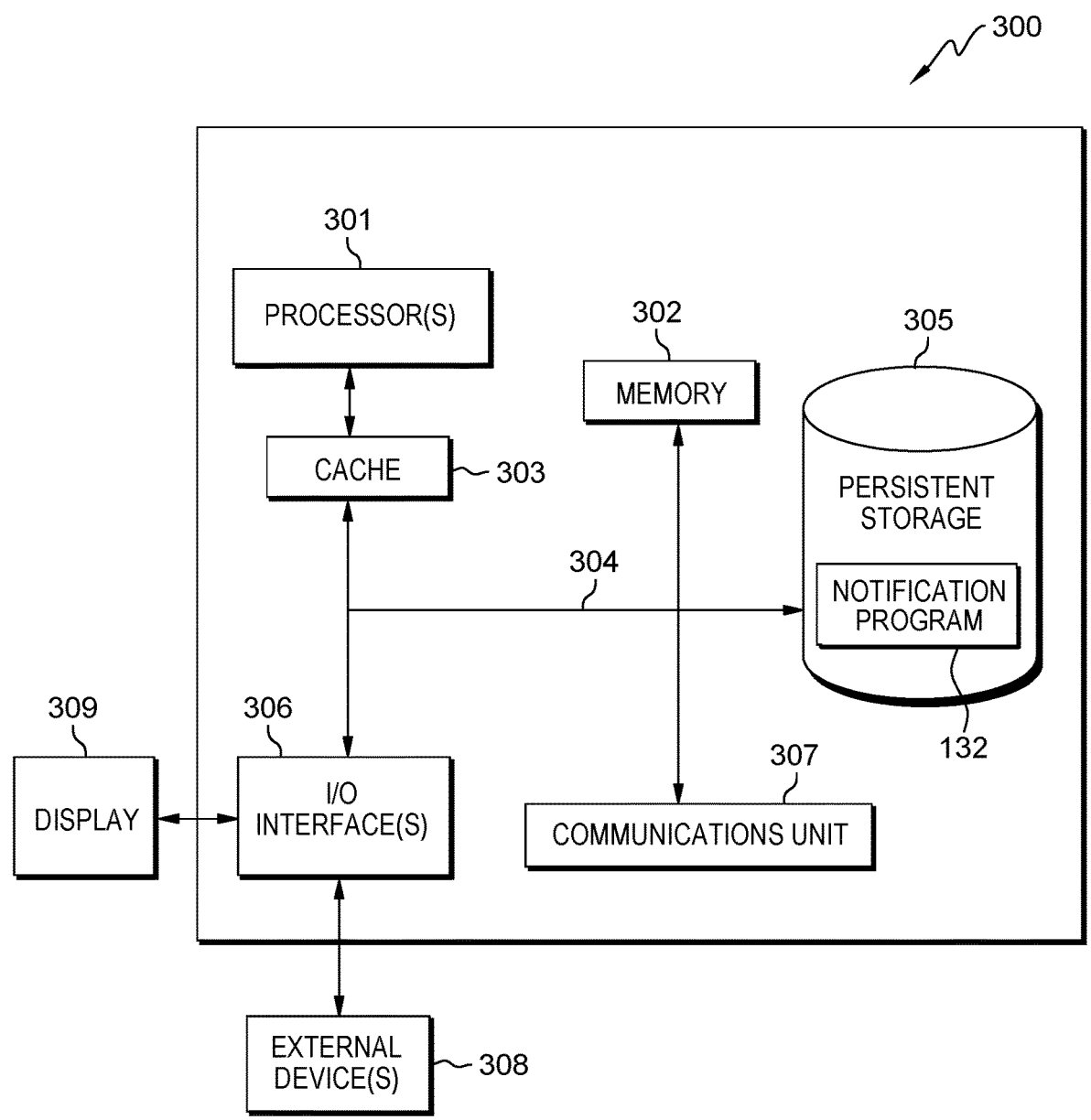
FIG. 3 depicts a block diagram of components of the computing environment of FIG. 1, in accordance with an embodiment of the present invention.

FIG. 3 depicts computer system 300, which is an example of a system that includes notification program 132. Computer system 300 includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method, the method comprising:
responsive to determining that an original message sent by a sender has been viewed by one or more recipients, determining, by one or more computer processors, whether the original message has been edited by the sender;
responsive to determining that the original message has been edited by the sender, scoring, by the one or more computer processors, one or more edits to the original message based on an analysis of the one or more edits to the original message, wherein:
an edit to at least one of a subject, a verb, an action, an object, and a context of the original message is assigned an edit score equal to a threshold; and
an edit to at least one of a spelling correction and a grammar change is assigned an edit score less than the threshold;
determining, by the one or more computer processors, an overall edit score by summing each edit score;
responsive to determining that the overall edit score equals or exceeds the threshold, determining, by the one or more computer processors, the one or more edits in the original message are critical; and responsive to determining that at least one edit of the one or more edits in the original message are critical, re-notifying, by the one or more computer processors, the one or more recipients of the original message that the original message has been edited by the sender.

2. The method of claim 1, further comprising:

receiving, by the one or more computer processors, an indication of a sent message, wherein the sent message is the original message;

analyzing, by the one or more computer processors, the original message using at least one of natural language processing, natural language classifier, and machine learning, wherein the analysis of the original message identifies one or more subjects, one or more verbs, one or more actions, and one or more critical objects included in the original message; and determining, by the one or more computer processors, whether the original message sent by the sender has been viewed by at least one of the one or more recipients.

3. The method of claim 2, wherein a technology to determine whether the original message sent by the sender has been viewed by the one or more recipients is selected from the group consisting of eye gaze technology, visual recognition, mouse tracking, and interaction tracking.

4. The method of claim 1, further comprising:

creating, by the one or more compute processors, a mapping between one or more original messages that are not edited by the sender and one or more edited messages.

5. The method of claim 1, further comprising:

responsive to determining that at least one of the one or more recipients have responded with one or more responses to the original message prior to the one or more edits to the original message by the sender, creating, by the one or more computer processors, a virtual grouping, wherein the virtual grouping includes:
 the original message;
 the one or more responses to the original message by the one or more recipients;
 one or more subsequent edits to the original message; and
 one or more replies by the sender of the original message in response to the one or more responses to the original message by the one or more recipients;

displaying, by the one or more computer processors, the created virtual grouping in a graphical user interface;

responsive to one of the one or more recipients selecting a portion of content in the virtual grouping, toggling to, and displaying, by the one or more computer processors, the selected portion of content to the one recipient;

removing, by the one or more computer processors, content from the created virtual grouping if the content is no longer relevant based on one of a recipient response and a sender reply; and prompting, by the one or more computer processors, one of the recipient and the sender to remove content from the created virtual pairing.

6. A computer program product, the computer program product comprising:

one or more computer readable storage media; and program instructions stored on the one or more computer readable storage media, the program instructions comprising:

responsive to determining that an original message sent by a sender has been viewed by one or more recipients, program instructions to determine whether the original message has been edited by the sender;

responsive to determining that the original message has been edited by the sender, program instructions to score the one or more edits to the original message based on an analysis of the one or more edits to the original message, wherein:
 an edit to at least one of a subject, a verb, an action, an object, and a context of the original message is assigned an edit score equal to a threshold; and
 an edit to at least one of a spelling correction and a grammar change is assigned an edit score less than the threshold;

program instructions to determine an overall edit score by summing each edit score;

responsive to determining that the overall edit score equals or exceeds the threshold, program instructions to determine the one or more edits in the original message are critical; and responsive to determining that at least one edit of the one or more edits in the original message are critical, program instructions to re-notify the one or more recipients of the original message that the original message has been edited by the sender.

7. The computer program product of claim 6, further comprising program instructions stored on the one or more computer readable storage media, to:

receive an indication of a sent message, wherein the sent message is the original message;

analyze the original message using at least one of natural language processing, natural language classifier, and machine learning, wherein the analysis of the original message identifies one or more subjects, one or more verbs, one or more actions, and one or more critical objects included in the original message; and determine whether the original message sent by the sender has been viewed by at least one of the one or more recipients.

8. The computer program product of claim 7, wherein a technology to determine whether the original message sent by the sender has been viewed by the one or more recipients is selected from the group consisting of eye gaze technology, visual recognition, mouse tracking, and interaction tracking.

9. The computer program product of claim 6, further comprising program instructions stored on the one or more computer readable storage media, to:

create a mapping between one or more original messages that are not edited by the sender and one or more edited messages.

10. The computer program product of claim 6, further comprising program instructions stored on the one or more computer readable storage media, to:

responsive to determining that at least one of the one or more recipients have responded with one or more responses to the original message prior to the one or more edits in the original message by the sender, create a virtual grouping, wherein the virtual grouping includes:
 the original message;
 the one or more responses to the original message by the one or more recipients;
 one or more subsequent edits to the original message; and one or more replies by the sender of the original message in response to the one or more responses to the original message by the one or more recipients;

display the created virtual grouping in a graphical user interface;

responsive to one of the one or more recipients selecting a portion of content in the virtual grouping, toggle to, and display the selected portion of content to the one recipient;

remove content from the created virtual grouping if the content is no longer relevant based on one of a recipient response and a sender reply; and prompt one of the recipient and the sender to remove content from the created virtual pairing.

11. A computer system, the computer system comprising:
one or more computer processors;
one or more computer readable storage media; and
program instructions stored on the one or more computer readable storage media for execution by at least one of the one or more computer processors, the program instructions comprising:

responsive to determining that an original message sent by a sender has been viewed by one or more recipients, program instructions to determine whether the original message has been edited by the sender;

responsive to determining that the original message has been edited by the sender, responsive to determining that the original message has been edited by the sender, program instructions to score the one or more edits to the original message based on an analysis of the one or more edits to the original message, wherein:
an edit to at least one of a subject, a verb, an action, an object, and a context of the original message is assigned an edit score equal to a threshold; and
an edit to at least one of a spelling correction and a grammar change is assigned an edit score less than the threshold;

program instructions to determine an overall edit score by summing each edit score;

responsive to determining that the overall edit score equals or exceeds the threshold, program instructions to determine the one or more edits in the original message are critical; and responsive to determining that at least one edit of the one or more edits in the original message are critical, program instructions to re-notify the one or more recipients of the original message that the original message has been edited by the sender.

12. The computer system of claim 11, further comprising program instructions stored on the one or more computer readable storage media for execution by at least one of the one or more computer processors, to:
receive an indication of a sent message, wherein the sent message is the original message;
analyze the original message using at least one of natural language processing, natural language classifier, and machine learning, wherein the analysis of the original message identifies one or more subjects, one or more verbs, one or more actions, and one or more critical objects included in the original message; and
determine whether the original message sent by the sender has been viewed by at least one of the one or more recipients.

13. The computer system of claim 12, wherein a technology to determine whether the original message sent by the sender has been viewed by the one or more recipients is selected from the group consisting of eye gaze technology, visual recognition, mouse tracking, and interaction tracking.

14. The computer system of claim 11, further comprising program instructions stored on the one or more computer readable storage media for execution by at least one of the one or more computer processors, to:
create a mapping between one or more original messages that are not edited by the sender and one or more edited messages.

* * * * *